US009325408B2

(12) United States Patent
Parkkonen

(10) Patent No.: US 9,325,408 B2
(45) Date of Patent: Apr. 26, 2016

(54) SATELLITE RECEIVER MODULE FOR TELECOMMUNICATION EQUIPMENT

(71) Applicant: TELLABS OY, Espoo (FI)

(72) Inventor: Pertti Parkkonen, Otalampi (FI)

(73) Assignee: CORIANT OY, Espoo (FI)

(*) Notice: Subject to any disclaimer, the term of this patent is extended or adjusted under 35 U.S.C. 154(b) by 64 days.

(21) Appl. No.: 14/173,091

(22) Filed: Feb. 5, 2014

(65) Prior Publication Data
US 2014/0219163 A1 Aug. 7, 2014

(30) Foreign Application Priority Data
Feb. 5, 2013 (FI) .................................. 20135112

(51) Int. Cl.
H04B 7/185 (2006.01)
G01S 19/14 (2010.01)
H04J 3/06 (2006.01)
G01S 19/35 (2010.01)
H04B 1/3805 (2015.01)

(52) U.S. Cl.
CPC ............ *H04B 7/18519* (2013.01); *G01S 19/14* (2013.01); *H04B 7/18517* (2013.01); *H04J 3/0644* (2013.01); *H04J 3/0685* (2013.01); *G01S 19/35* (2013.01); *H04B 1/3805* (2013.01)

(58) Field of Classification Search
CPC .......................... H04B 7/18519; H04B 7/185
USPC ......................................................... 370/316
See application file for complete search history.

(56) References Cited

U.S. PATENT DOCUMENTS

| 2002/0123365 | A1 | 9/2002 | Thorson et al. | |
|---|---|---|---|---|
| 2003/0016770 | A1* | 1/2003 | Trans et al. | 375/346 |
| 2004/0213367 | A1 | 10/2004 | Han | |
| 2006/0136173 | A1* | 6/2006 | Case et al. | 702/182 |
| 2006/0238415 | A1 | 10/2006 | Gilkes | |
| 2009/0109091 | A1 | 4/2009 | Thind et al. | |
| 2010/0073228 | A1 | 3/2010 | Smith | |

(Continued)

FOREIGN PATENT DOCUMENTS

| EP | 2256941 A2 | 12/2010 |
|---|---|---|
| WO | 9900928 A2 | 1/1999 |

OTHER PUBLICATIONS

European Search Report, dated May 9, 2014, from corresponding EP application.

(Continued)

*Primary Examiner* — Dang Ton
*Assistant Examiner* — Nourali Mansoury
(74) *Attorney, Agent, or Firm* — Young & Thompson

(57) ABSTRACT

A satellite receiver module for telecommunication equipment includes circuitries configured to receive timing information from one or more satellites and to form timing messages based on a clock signal in accordance with the received timing information. The clock signal is a stream of temporally successive clock pulses and the pulse-rate of the clock signal is accordant with a pace indicating signal received. from a body device of the telecommunication equipment. The satellite receiver module further includes a data interface including a connector for detachably attaching to the body device and for transferring the timing messages to the body device. Because the pulse-rate, i.e. the frequency, of the clock signal is accordant with the pace indicating signal received from the body device, a high-quality local oscillator is not necessary in the satellite receiver module.

16 Claims, 6 Drawing Sheets

(56) References Cited

U.S. PATENT DOCUMENTS

| | | |
|---|---|---|
| 2011/0103337 A1 | 5/2011 | Bryant et al. |
| 2012/0127922 A1* | 5/2012 | Feher .......................... 370/320 |
| 2014/0278220 A1* | 9/2014 | Yuen .......................... 702/150 |
| 2014/0303892 A1* | 10/2014 | Morlock ...................... 701/533 |

OTHER PUBLICATIONS

Finnish Search Report, dated Nov. 5, 2013, from corresponding FI application.

* cited by examiner

SATELLITE RECEIVER MODULE FOR TELECOMMUNICATION EQUIPMENT

FIELD OF THE INVENTION

The invention relates to a method for forming timing messages in a satellite receiver module of telecommunication equipment. Furthermore, the invention relates to a satellite receiver module, to telecommunication equipment, and to a computer program for forming timing messages in a satellite receiver module of telecommunication equipment.

BACKGROUND

In many cases it is advantageous that telecommunication equipment is modular so that the telecommunication equipment comprises a body device and one or more modules that can be detachably attached to the body device. The telecommunication equipment can be, for example but not necessarily, an internet protocol "IP" router, an Ethernet switch, an Asynchronous Transfer Mode "ATM" switch, and/or a MultiProtocol Label Switching "MPLS" switch. Each module can be, for example, a transceiver module or another module such as a satellite receiver module which may comprise a circuitry for receiving location and/or timing information from one or more satellites. The above-mentioned circuitry of the satellite receiver module can be, for example, a Global Navigation Satellite System "GNSS"-receiver that is configured to extract location and/or timing information from one or more received GNSS-signals. The GNSS can be, for example but not necessarily, the US Global Positioning System "GPS" or the Russian GLONASS-satellite system. The timing information is typically extracted from the received GNSS-signals in a form of a pulse per second "PPS"-signal which comprises successive and temporally equidistant timing pulses. The satellite receiver module comprises a circuitry for forming timing messages on the basis of the received timing information and on the basis of a clock signal that is a stream of temporally successive clock pulses. The timing messages may indicate for example a phase reference and/or a time reference. The time reference can be, for example, a wall-clock time reference that is common to two or more network elements, e.g. routers, of a data transfer network. Furthermore, the satellite receiver module comprises a data interface comprising a connector for detachably attaching to the body device of the telecommunication equipment and for transferring the timing messages to the body device.

The quality of the phase reference and/or the time reference indicated by the timing messages depends at least partly on the phase and frequency stabilities of the above-mentioned clock signal. An inconvenience related to a high quality clock signal needed for forming a high quality phase reference and/or time reference is the size, the power consumption, and/or the price of a high quality oscillator capable of generating the high quality clock signal.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention there is provided a new satellite receiver module for telecommunication equipment. A satellite receiver module according to the invention comprises:

a first circuitry for receiving timing information from one or more satellites, a second circuitry for forming timing messages based on a clock signal in accordance with the received timing information, the clock signal being a stream of temporally successive clock pulses, a third circuitry for receiving a pace indicating signal from a body device of the telecommunication equipment and for delivering the clock signal to the second circuitry so that the pulse-rate, i.e. the frequency, of the clock signal is accordant with the pace indicating signal, and a data interface comprising a connector for detachably attaching to the body device of the telecommunication equipment and for transferring the timing messages to the body device of the telecommunication equipment.

The second circuitry is configured to determine the timing messages according to arrival moments of timing pulses carried by the timing information received from the one or more satellites and to count the clock pulses of the clock signal on time intervals between successive arrivals of the timing Pulses to form values for the timing messages on the time intervals between the successive arrivals of the timing pulses.

Because the pulse-rate of the clock signal is accordant with the pace indicating signal received from the body device, a high-quality local oscillator is not necessary in the satellite receiver module in order to form timing messages indicating a high quality phase reference and/or time reference. Therefore, for example the size of a satellite receiver module according to the invention does not have to be determined by the size of a high quality oscillator.

In accordance with the invention there is provided also new telecommunication equipment. Telecommunication equipment according to the invention comprises a satellite receiver module according to the invention, and a body device comprising:

a data interface comprising a connector for detachably attaching to the corresponding connector of the data interface of the satellite receiver module, and a circuitry for delivering the pace indicating signal to the satellite receiver module and for receiving the timing messages from the satellite receiver module.

In accordance with the invention there is provided also a new method for forming timing messages in a satellite receiver module of telecommunication equipment, where the satellite receiver module is detachably attached to a body device of the telecommunication equipment. A method according to the invention comprises:

receiving, at the satellite receiver module, timing information from one or more satellites, receiving, at the satellite receiver module, a pace indicating signal from the body device, forming the timing messages on the basis of a clock signal in accordance with the received timing information, the clock signal being a stream of temporally successive clock pulses and the pulse-rate of the clock signal being accordant with the pace indicating signal, and transferring, from the satellite receiver module, the timing messages to the body device.

The timing messages are determined according to arrival moments of timing pulses carried by the timing information received from the one or more satellites, and the clock pulses are counted on time intervals between successive arrivals of the timing pulses so as to form values for the timing messages on the time intervals between the successive arrivals of the timing pulses.

In accordance with the invention there is provided also a new computer program for forming timing messages in a satellite receiver module of telecommunication equipment, where the satellite receiver module is detachably attachable to a body device of the telecommunication equipment. A computer program according to the invention comprises computer executable instructions for controlling a programmable processor of the satellite receiver module to:

- form the timing messages on the basis of a clock signal in accordance with timing information received from one or more satellites, the clock signal being a stream of temporally successive clock pulses and the pulse-rate of the clock signal being accordant with a pace indicating signal received from the body device, and
- control a data interface of the satellite receiver module to transfer the timing messages to the body device.

The computer executable instructions for controlling the programmable processor to form the timing messages include computer executable instructions for controlling the programmable processor to determine the timing messages according to arrival moments of timing pulses carried by the timing information received from the one or more satellites and to count the clock pulses on time intervals between successive arrivals of the timing pulses so as to form values for the timing messages on the time intervals between the successive arrivals of the timing pulses.

A computer program product according to the invention comprises a non-volatile computer readable medium, e.g. a compact disc ("CD"), encoded with a computer program according to the invention.

A number of exemplifying embodiments of the invention are described in accompanied dependent claims.

Various exemplifying embodiments of the invention both as to constructions and to methods of operation, together with additional objects and advantages thereof, will be best understood from the following description of specific exemplifying embodiments when read in connection with the accompanying drawings.

The verbs "to comprise" and "to include" are used in this document as open limitations that neither exclude nor require the existence of also un-recited features. The features recited in depending claims are mutually freely combinable unless otherwise explicitly stated.

BRIEF DESCRIPTION OF FIGURES

Exemplifying embodiments of the invention and their advantages are explained in greater detail below with reference to the accompanying drawings, in which.

DESCRIPTION OF EXEMPLIFYING EMBODIMENTS

Figure 1:
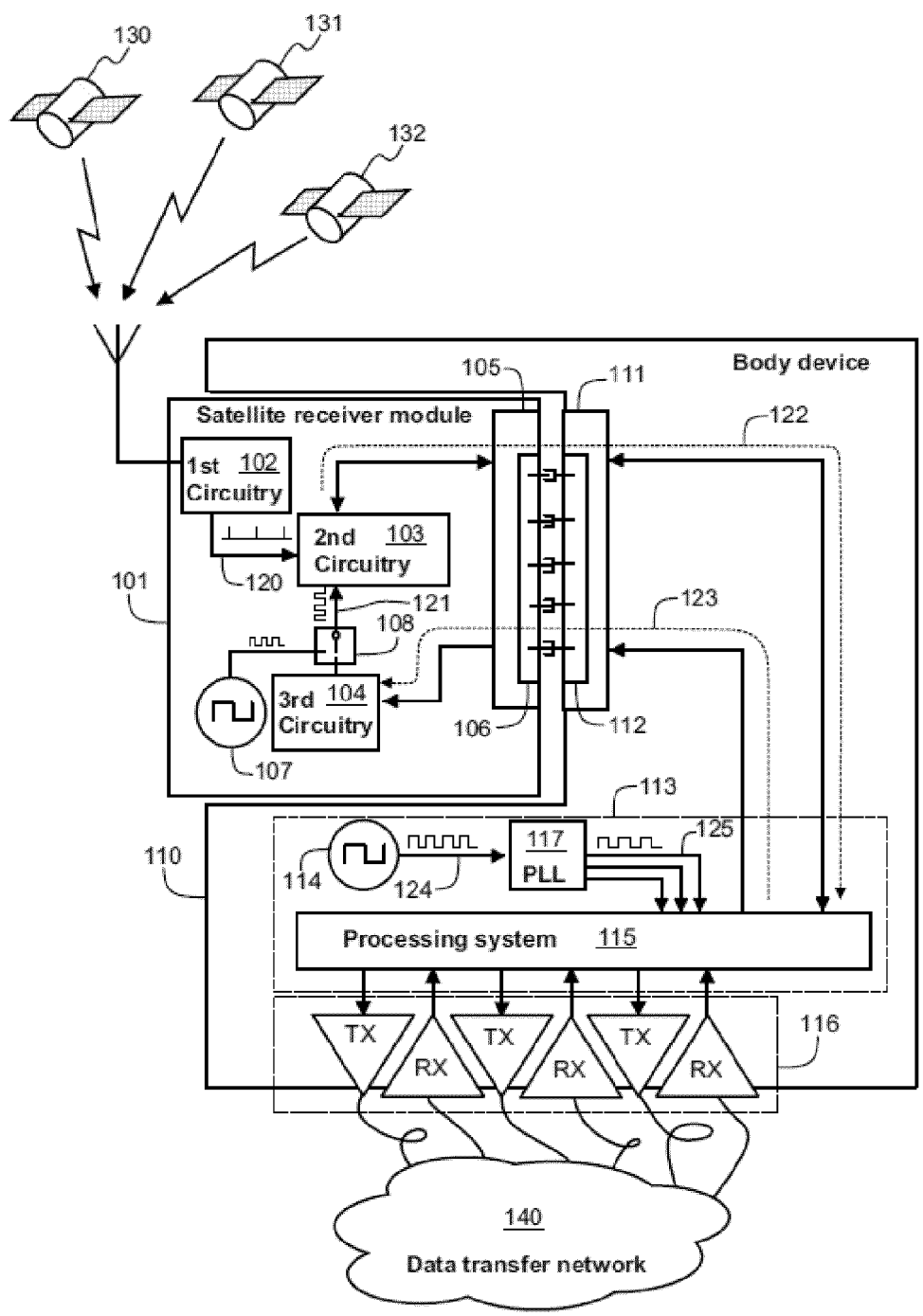
FIG. 1 shows a schematic illustration of telecommunication equipment according to an exemplifying embodiment of the invention.

FIG. 1 shows a schematic illustration of telecommunication equipment according to an exemplifying embodiment of the invention. The telecommunication equipment comprises a satellite receiver module 101 and a body device 110. The body device can be, for example, an internet protocol "IP" router, an Ethernet switch, an Asynchronous Transfer Mode "ATM" switch, and/or a MultiProtocol Label Switching "MPLS" switch. The body device may comprise ingress and egress ports 116 for connecting to a data transfer network 140. The satellite receiver module 101 comprises a first circuitry 102 for receiving one or more signals from one or more satellites 130, 131, and 132 and for extracting timing information 120 from the received one or more signals. The first circuitry 102 can be configured to extract also location information from the one or more signals received from the one or more satellites. The satellites can be, for example, Global Navigation Satellite System "GNSS"-satellites and the first circuitry 102 can be, for example, a GNSS-receiver that is configured to extract location and timing information from one or more received GNSS-signals. The satellite receiver module 101 can be, for example, a Small Form factor Pluggable "SFP" GNSS-module. The GNSS can be, for example but not necessarily, the US Global Positioning System "GPS" or the Russian GLONASS-satellite system. The timing information 120 can be extracted from the one or more received GNSS-signals in a form of, for example, a pulse per second "PPS"-signal which comprises successive and temporally equidistant timing pulses.

The satellite receiver module 101 comprises a second circuitry 103 for forming timing messages based on a first clock signal 121 in accordance with the received timing information 120. The timing messages can be formed, for example, so that a phase reference and/or a time reference indicated by each timing message are/is determined according to an arrival moment of a timing pulse at each time when a timing pulse arrives from one of the satellites and, on the mean time between successive arrivals of the timing pulses, the phase and/or the time reference are/is based on a counter configured to count clock pulses of the first clock signal 121. The satellite receiver module 101 comprises a data interface 105 that comprises a connector 106 for detachably attaching to the body device 110 and for transferring the timing messages to the body device. The timing messages being transferred are illustrated with a dashed line arrow 122 shown in FIG. 1. The satellite receiver module 101 comprises a third circuitry 104 for receiving a pace indicating signal 123 from the body device 110 and for delivering the clock signal 121 to the second circuitry 103 so that a pulse-rate, i.e. the frequency, of the clock signal 121 is accordant with the pace indicating signal. In the exemplifying case illustrated in FIG. 1, the pace indicating signal 123 is a bit stream received from the body device 110. The third circuitry 104 is configured to extract the clock signal 121 from the bit stream. The bit stream can be transmitted from the body device, for example, in accordance with a transmission clock of the telecommunication equipment, with a reception clock of the telecommunication equipment, or with some other clock available in the body device and having a sufficiently high quality. The transmission clock can be a clock used by one or more of the egress ports of the body device and the reception clock can be a clock used by one or more of the ingress ports of the body device. The third circuitry 104 may comprise, for example, means for extracting the bit or baud rate from the bit stream and a phase-locked loop "PLL" for controlling the pulse-rate of the clock signal 121 according to the extracted bit or baud rate. The satellite receiver module 101 may further comprise a local oscillator 107 and a controllable selector 108 for selecting whether the third circuitry 104 is used for delivering the clock signal 121 to the second circuitry 103 or whether the local oscillator 107 is used as a source of the clock signal 121.

The body device 110 comprises a data interface 111 that comprises a connector 112 for detachably attaching to the corresponding connector 106 of the data interface 105 of the satellite receiver module 101. In the exemplifying case illustrated in FIG. 1, the connectors 106 and 112 are electrical connectors comprising connector poles capable of providing galvanic couplings for electrical data transfer between the satellite receiver module 101 and the body device 110. It is also possible that the data interfaces 105 and 111 comprise optical interfaces for optical data transfer between the satellite receiver module 101 and the body device 110. The body device 110 comprises a fourth circuitry 113 for delivering the above-mentioned pace indicating signal 123 to the satellite receiver module 101 and for receiving the timing messages from the satellite receiver module. In the exemplifying case illustrated in FIG. 1, the fourth circuitry 113 comprises an oscillator 114 for generating a clock signal 124 and a PLL-circuit 117 for generating, on the basis of the clock signal 124, clock signals having desired frequencies. One of the clock signals generated by the PLL-circuit 117 is denoted with a reference number 125. The oscillator 114 can be a controllable oscillator that is controlled with timing information received from the data transfer network 140, but it is also possible that the oscillator is a free running oscillator. Furthermore, the fourth circuitry 113 comprises a processing system 115 for running communication protocols such as, for example, the Transmission Control Protocol "TCP", the internet protocol "IP", the Ethernet protocol, the Asynchronous Transfer Mode "ATM" protocol, and/or the MultiProtocol Label Switching "MPLS" protocol. Furthermore, the processing system 115 is configured to transmit, to the satellite receiver module 101, the bit stream that represents the pace indicating signal 123. The bit stream can be, for example but not necessarily, deterministically alternating ones and zeroes or pseudo-random data generated with a suitable scrambler.

The first, second, and third circuitries 102-104 and the data interface 105 of the satellite receiver module 101 can be physically implemented with a single integrated component or with two or more separate interconnected components. The physical implementation of the first, second, and third circuitries 102-104 and the data interface 105 may comprise one or more programmable processor circuits, one or more dedicated hardware circuits such as an application specific integrated circuit "ASIC", and/or one or more field programmable logic circuits such as a field programmable gate array "FPGA". In conjunction with some exemplifying embodiments of the invention, certain functionalities of the first, second and/or third circuitries 102-104 and/or the data interface 105 can be implemented, for example, with a same programmable hardware. Thus, in the physical implementation, the first, second, and/or third circuitries 102-104 and/or the data interface 105 are not necessarily separate in the way shown in FIG. 1. It is to be noted that FIG. 1 is presented for illustrative purposes. The processing system 115 of the body device 110 can be implemented with one or more programmable processor circuits, one or more dedicated hardware circuits such as an application specific integrated circuit "ASIC", one or more field programmable logic circuits such as a field programmable gate array "FPGA", or a combination of these.

Figure 2A:
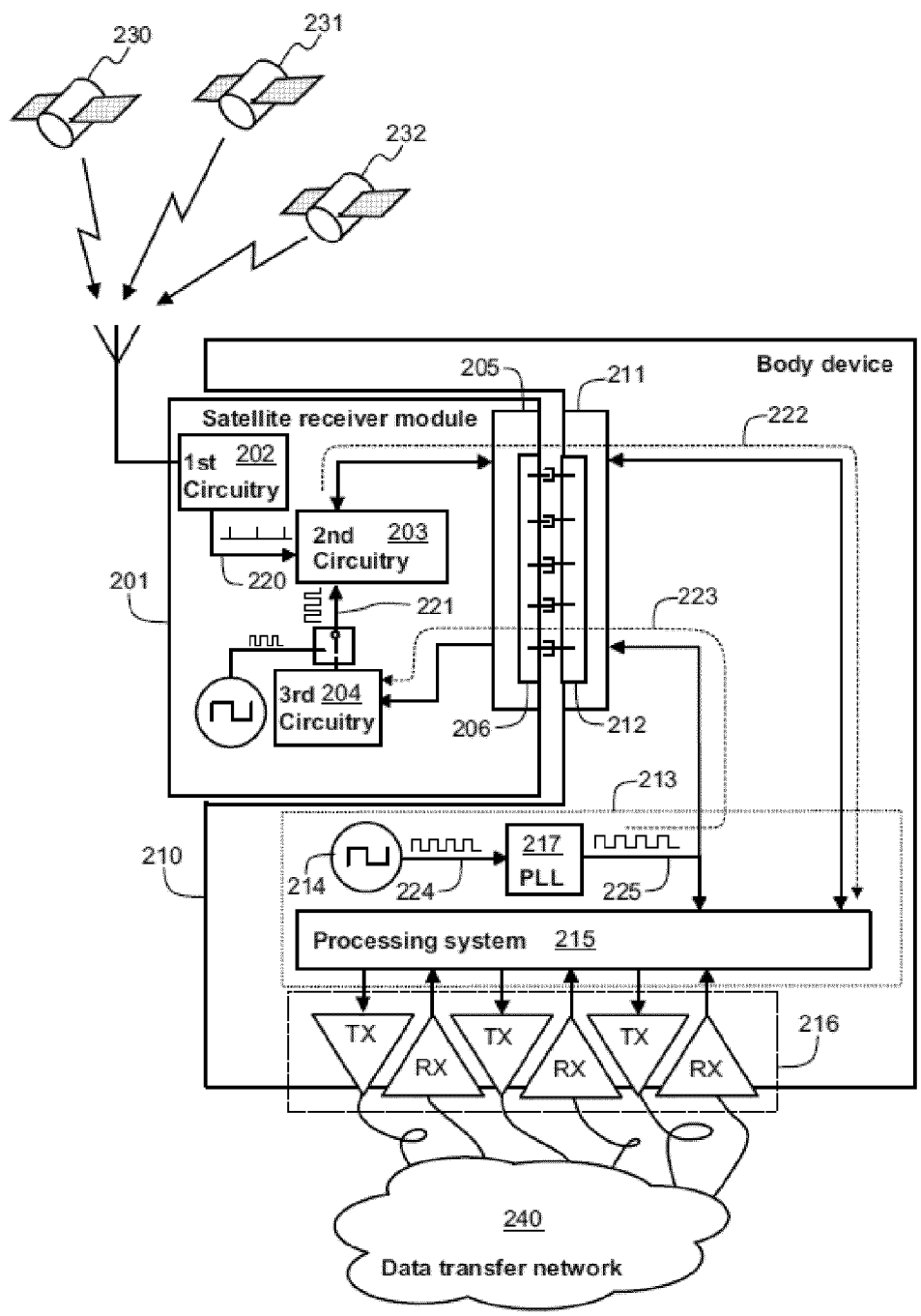
FIG. 2a shows a schematic illustration of telecommunication equipment according to an exemplifying embodiment of the invention.

FIG. 2a shows a schematic illustration of telecommunication equipment according to an exemplifying embodiment of the invention. The telecommunication equipment comprises a satellite receiver module 201 and a body device 210 that comprises ingress and egress ports 216 for connecting to a data transfer network 240. The satellite receiver module 201 can be, for example, a plug-in unit connectable to the body device 210. The satellite receiver module 201 comprises a first circuitry 202 for receiving timing information 220 from one or more satellites 230, 231, and 232. The satellite receiver module 201 comprises a second circuitry 203 for forming timing messages 222 based on a first clock signal 221 in accordance with the received timing information 220, the first clock signal being a stream of temporally successive first clock pulses. The satellite receiver module 201 comprises a third circuitry 204 for receiving a pace indicating signal 223 from the body device 210 and for delivering the first clock signal 221 to the second circuitry so that the pulse-rate, i.e. the frequency, of the first clock signal 221 is accordant with the pace indicating signal 223. The satellite receiver module 201 comprises a data interface 205 comprising a connector 206 for detachably attaching to the body device 210 and for transferring the timing messages 222 to the body device. The body device 210 comprises a data interface 211 comprising a connector 212 for detachably attaching to the corresponding connector 206 of the data interface 205 of the satellite receiver module. The body device 210 comprises a fourth circuitry 213 for delivering the pace indicating signal 223 to the satellite receiver module 201 and for receiving the timing messages 222 from the satellite receiver module. The fourth circuitry 213 comprises an oscillator 214 for generating a clock signal 224 and a PLL-circuit 217 for generating, on the basis of the clock signal 224, a second clock signal 225 having a desired frequency. Furthermore, the fourth circuitry 213 comprises a processing system 215 for running communication protocols and for receiving the timing messages 222. In the exemplifying case illustrated in FIG. 2a, the pace indicating signal 223 is the clock signal 225. The clock signal 225 can be, for example, a transmission clock used by one or more of the egress ports of the telecommunication equipment, or a reception clock used by one or more of the ingress ports of the telecommunication equipment, or some other clock signal used by the body device 210. The third circuitry 204 of the satellite receiver module 201 is configured to generate the first clock signal 221 with a phase-locked loop on the basis of the clock signal 225.

Figure 2B:
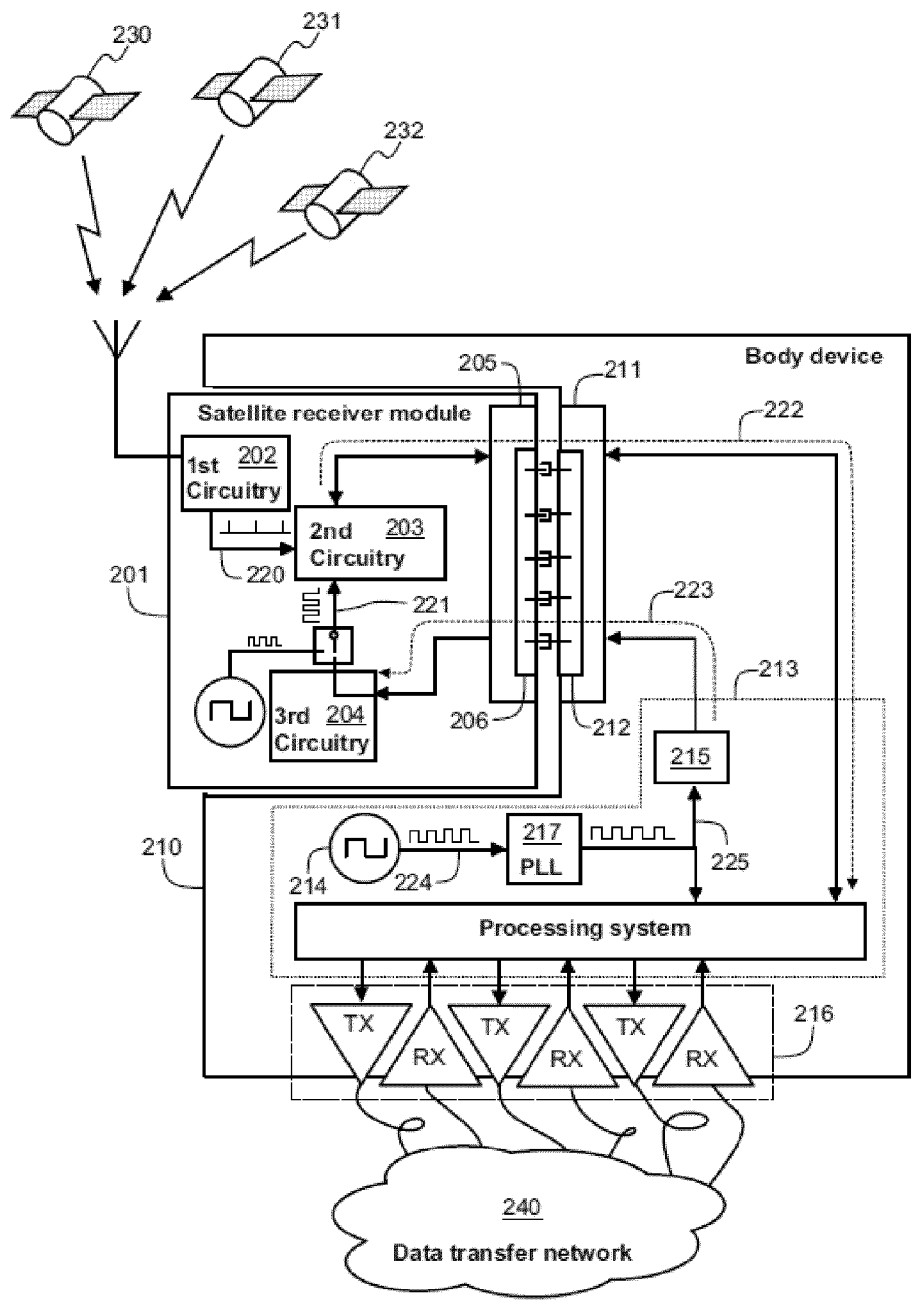
FIG. 2b shows a schematic illustration of telecommunication equipment according to an exemplifying embodiment of the invention.

FIG. 2b shows a schematic illustration of telecommunication equipment according to an exemplifying embodiment of the invention. In the exemplifying case illustrated in FIG. 2b, the fourth circuitry 213 of the body device 210 comprises a PLL-circuit 215 for generating the first clock signal 221 on the basis of the second clock signal 225. The third circuitry 204 of the satellite receiver module 201 is configured receive the first clock signal 221 from the body device 210 and to deliver the first clock signal to the second circuitry 203. Therefore, in this exemplifying case, the pace indicating signal 223 received at the satellite receiver module 201 is the first clock signal 221.

Figure 3A:
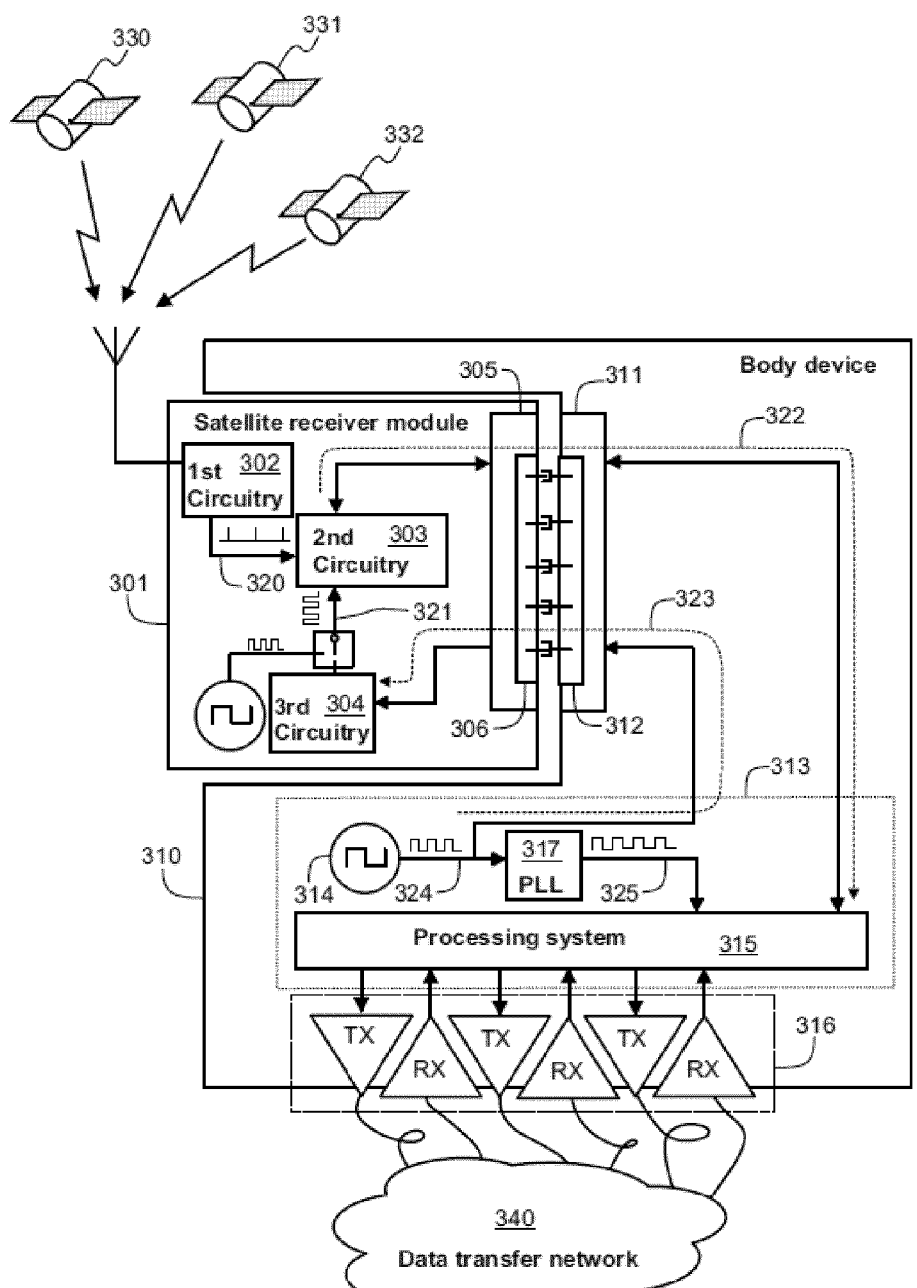
FIG. 3a shows a schematic illustration of telecommunication equipment according to an exemplifying embodiment of the invention.

FIG. 3a shows a schematic illustration of telecommunication equipment according to an exemplifying embodiment of the invention. The telecommunication equipment comprises a satellite receiver module 301 and a body device 310 that comprises ingress and egress ports 316 for connecting to a data transfer network 340. The satellite receiver module 301 comprises a first circuitry 302 for receiving timing information 320 from one or more satellites 330, 331, and 332. The satellite receiver module 301 comprises a second circuitry 303 for forming timing messages 322 based on a first clock signal 321 in accordance with the received timing information 320, the first clock signal being a stream of temporally successive first clock pulses. The satellite receiver module 301 comprises a third circuitry 304 for receiving a pace indicating signal 323 from the body device 310 and for delivering the first clock signal 321 to the second circuitry so that the pulse-rate of the first clock signal 321 is accordant with the pace indicating signal 323. The satellite receiver module 301 comprises a data interface 305 comprising a connector 306 for detachably attaching to the body device 310 and for transferring the timing messages 322 to the body device. The body device 310 comprises a data interface 311 comprising a connector 312 for detachably attaching to the corresponding connector 306 of the data interface 305 of the satellite receiver module. The body device 310 comprises a fourth circuitry 313 for delivering the pace indicating signal 323 to the satellite receiver module 301 and for receiving the timing messages 322 from the satellite receiver module. The fourth circuitry 313 comprises an oscillator 314 for generating a clock signal 324 and a PLL-circuit 317 for generating, on the basis of the clock signal 324, one or more clock signals 325 having desired frequencies. Furthermore, the fourth circuitry 313 comprises a processing system 315 for running communication protocols and for receiving the timing messages 322. In the exemplifying case illustrated in FIG. 3a, the pace indicating signal 323 is the clock signal 324, i.e. the output signal of the oscillator 314 of the body device 310.

Figure 3B:
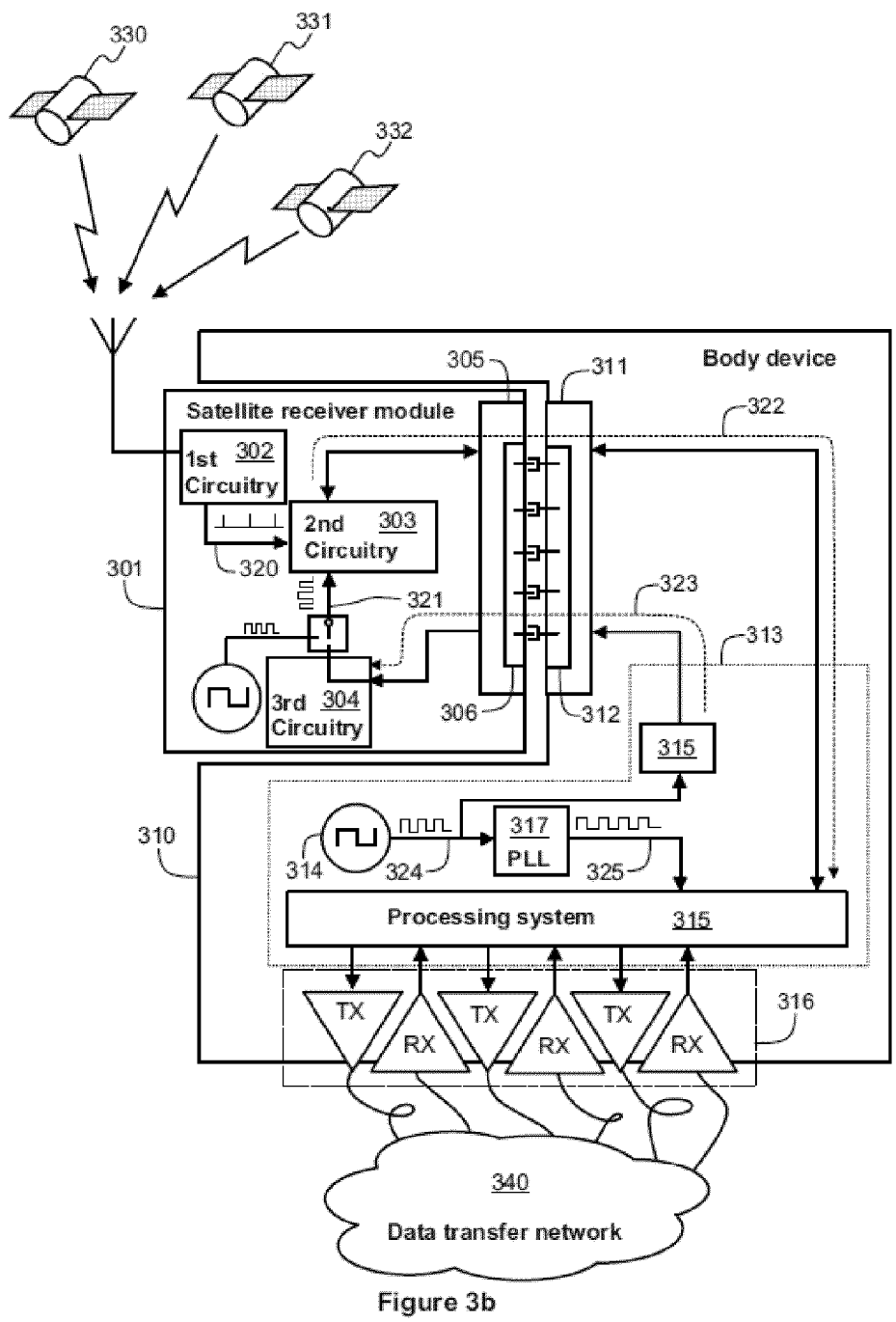
FIG. 3b shows a schematic illustration of telecommunication equipment according to an exemplifying embodiment of the invention.

FIG. 3b shows a schematic illustration of telecommunication equipment according to an exemplifying embodiment of the invention. In the exemplifying case illustrated in FIG. 3b, the fourth circuitry 313 of the body device 310 comprises a PLL-circuit 315 for generating the first clock signal 321 on the basis of the clock signal 324. The third circuitry 304 of the satellite receiver module 301 is configured receive the first clock signal 321 from the body device 310 and to deliver the first clock signal to the second circuitry 303. Therefore, in this exemplifying case, the pace indicating signal 323 received at the satellite receiver module 301 is the first clock signal 321.

Figure 4:
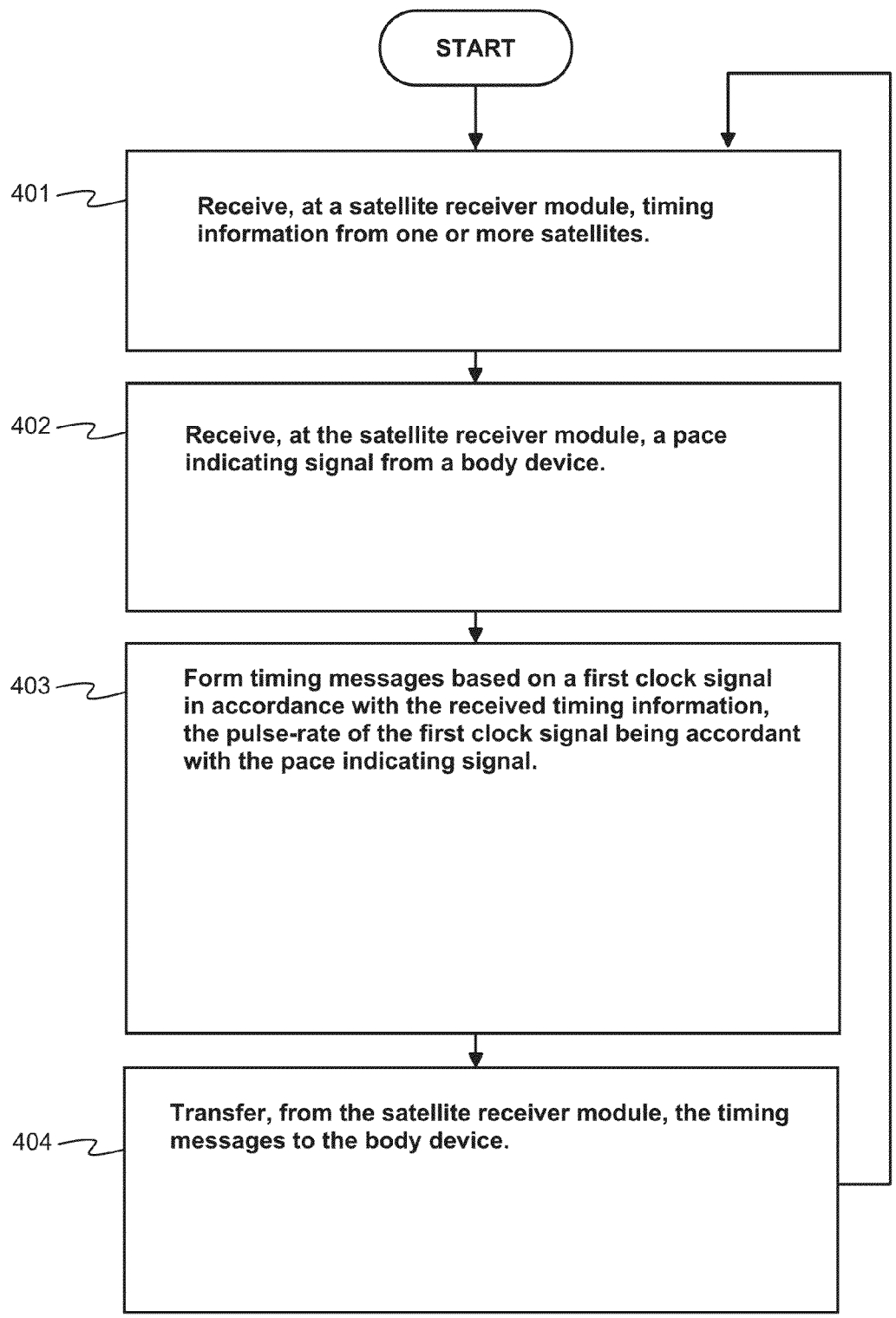
FIG. 4 shows a flow chart of a method according to an exemplifying embodiment of the invention for forming timing messages in a satellite receiver module of telecommunication equipment.

FIG. 4 shows a flow chart of a method according to an exemplifying embodiment of the invention for forming timing messages in a satellite receiver module of telecommunication equipment, where the satellite receiver module is detachably attached to a body device of the telecommunication equipment. The satellite receiver module can be, for example, a plug-in unit connected to the body device.

The above-mentioned method comprises the following actions:
- action 401: receiving, at the satellite receiver module, timing information from one or more satellites,
- action 402: receiving, at the satellite receiver module, a pace indicating signal from the body device,
- action 403: forming the timing messages on the basis of a first clock signal in accordance with the received timing information, the first clock signal being a stream of temporally successive first clock pulses and the pulse-rate of the first clock signal being accordant with the pace indicating signal, and
- action 404: transferring, from the satellite receiver module, the timing messages to the body device.

In a method according to an exemplifying embodiment of the invention, the pace indicating signal is a bit stream received from the body device of the telecommunication equipment and the first clock signal is extracted from the bit stream.

In a method according to an exemplifying embodiment of the invention, the pace indicating signal is a second clock signal received from the body device of the telecommunication equipment and being a stream of temporally successive second clock pulses, and the first clock signal is generated with a phase-locked loop on the basis of the second clock signal.

In a method according to an exemplifying embodiment of the invention, the first clock signal is received from the body device of the telecommunication equipment.

A method according to an exemplifying embodiment of the invention comprises selecting whether the first clock signal is based on the pace indicating signal received from the body device or whether a local oscillator located in the satellite receiver module is used as a source of the first clock signal.

A computer program according to an exemplifying embodiment of the invention comprises computer executable instructions for controlling a programmable processor to carry out a method according to one or more of the above-described exemplifying embodiments of the invention.

A computer program according to an exemplifying embodiment of the invention comprises software modules for forming timing messages in a satellite receiver module of telecommunication equipment, where the satellite receiver module is detachably attachable to a body device of the telecommunication equipment. The software modules comprise computer executable instructions for controlling a programmable processor of the satellite receiver module to:
- form the timing messages on the basis of a clock signal in accordance with timing information received from one or more satellites, the clock signal being a stream of temporally successive clock pulses and the pulse-rate, i.e. the frequency, of the clock signal being accordant with a pace indicating signal received from the body device, and
- control a data interface of the satellite receiver module to transfer the timing messages to the body device.

The software modules can be, for example, subroutines and/or functions generated with a suitable programming language.

A computer program product according to an exemplifying embodiment of the invention comprises a non-volatile computer readable medium, e.g. a compact disc ("CD"), encoded with a computer program according to an embodiment of the invention.

A signal according to an exemplifying embodiment of the invention is encoded to carry information defining a computer program according to an embodiment of the invention.

The specific examples provided in the description given above should not be construed as limiting the applicability and/or the interpretation of the appended claims.

What is claimed is:

1. A satellite receiver module for telecommunication equipment, the satellite receiver module comprising:
a first circuitry configured to receive timing information from one or more satellites;
a second circuitry configured to form timing messages based on a first clock signal in accordance with the received timing information, the first clock signal being a stream of temporally successive first clock pulses, the second circuitry being configured to determine the timing messages according to arrival moments of timing pulses carried by the timing information received from the one or more satellites and to count the first clock pulses at time intervals between successive arrivals of the timing pulses so as to form values for the timing messages at the time intervals between the successive arrivals of the timing pulses;

a data interface comprising a connector configured to detachably attach to a body device of the telecommunication equipment and to transfer the timing messages to the body device of the telecommunication equipment; and a third circuitry configured to receive a pace-indicating signal from the body device of the telecommunication equipment and to deliver the first clock signal to the second. circuitry so that a pulse-rate of the first clock signal is accordant with the pace-indicating signal.

2. The satellite receiver module according to claim 1, wherein the pace-indicating signal is a bit stream. received from the body device of the telecommunication equipment and the third circuitry is configured to extract the clock signal from the bit stream.

3. The satellite receiver module according to claim 1, wherein the pace-indicating signal is a second clock signal received from the body device of the telecommunication equipment and being a stream of temporally successive second clock pulses, and the third circuitry is configured to generate the first clock signal with a phase-locked loop on the basis of the second clock signal.

4. The satellite receiver module according to claim 1, wherein the third circuitry is configured receive the first. clock signal from the body device of the telecommunication equipment.

5. The satellite receiver module according to claim 1, wherein the satellite receiver module further comprises
a local oscillator, and
a controllable selector configured to select whether the third circuitry is used to deliver the first clock signal to the second circuitry or whether the local oscillator is used as a source of the first clock signal.

6. The satellite receiver module according to claim 1, wherein the data interface comprises an electrical connector comprising connector poles to provide galvanic couplings with corresponding connector poles of the body device.

7. The satellite receiver module according to claim 1, wherein the data interface comprises an optical interface configured to generate an optical signal carrying the timing messages.

8. The satellite receiver module according to claim 1, wherein the satellite receiver module is a plug-in unit connectable to the body device of the telecommunication equipment.

9. Telecommunication equipment, Comprising:
a satellite receiver module comprising
a first circuitry configured to receive timing information from one or more satellites,
a second circuitry configured to form timing messages based on a first clock signal in accordance with the received timing information, the first clock signal being a stream of temporally successive first clock pulses, the second circuitry being configured to determine the timing messages according to arrival moments of timing pulses carried by the timing information received from the one or more satellites and to count the first clock pulses at time intervals between successive arrivals of the timing pulses to form values for the timing messages at the time intervals between the successive arrivals of the timing pulses, a data interface comprising a connector configured to detachably attach to a body device and to transfer the timing messages to the body device, and a third circuitry or receiving a pace-indicating signal from the body device and for delivering the first clock signal to the second circuitry so that a pulse-rate of the first clock signal is accordant with the pace-indicating signal; and a body device comprising
a data interface comprising a connector configured to detachably attach to the connector of the data interface of the satellite receiver module, and
a fourth circuitry configured to deliver the pace-indicating signal to the satellite receiver module and to receive the timing messages from the satellite receiver module.

10. The telecommunication equipment according to claim 9, wherein the fourth circuitry is configured to deliver, to the satellite receiver module, a bit stream that represents the pace-indicating signal, the bit stream being transmitted from the body device in accordance with a clock signal available in the body device.

11. The telecommunication equipment according to claim 9, wherein the fourth circuitry is configured to deliver, to the satellite receiver module, a second clock signal that is a stream of temporally successive second clock pulses and that represents pace-indicating signal.

12. The telecommunication equipment according to claim 11, wherein the second clock signal is at least one of the following: a transmission clock of the telecommunication equipment, a reception clock of the telecommunication equipment, an output signal of an oscillator of the body device.

13. The telecommunication equipment according to claim 11, wherein the body device comprises a phase-locked loop circuit configured to generate the first clock signal to represent the pace-indicating signal on the basis of at least one of the following: a transmission clock of the telecommunication equipment, a reception clock of the telecommunication equipment, and an output signal of an oscillator of the body device.

14. The telecommunication equipment according to claim 9, wherein the body device is at least one of the following: an internet protocol (IP) router, an Ethernet switch, an Asynchronous Transfer Mode (ATM) switch, and a MultiProtocol Label Switching (MPLS) switch.

15. A method comprising:
receiving, at a satellite receiver module of telecommunication equipment, timing information from one or more satellites, the satellite receiver module being detachably attached to a body device of the telecommunication equipment;
receiving, at the satellite receiver module, a pace-indicating signal from the body device of the telecommunication equipment,
forming timing messages based on a first clock signal in accordance with the received timing information, the first clock signal being a stream of temporally successive first clock pulses and a pulse-rate of the first. clock signal being accordant with the pace-indicating signal, the timing messages being determined according to arrival moments of timing pulses carried by the timing information received from the one or more satellites, and the first clock pulses are counted at time intervals between successive arrivals of the timing pulses to form values for the timing messages at the time intervals between the successive arrivals of the timing pulses; and transferring, from the satellite receiver module, the timing messages to the body device of the telecommunication equipment.

16. A non-transitory computer readable medium encoded with a computer program, the computer program comprising computer-executable instructions for controlling a programmable processor of a satellite receiver module of telecommunication equipment to:

form timing messages based on a first clock signal in accordance with timing information received from one or more satellites, the first. clock signal being a stream of temporally successive first clock pulses and a pulse-rate of the first clock signal being accordant with a pace-indicating signal received from a body device of the telecommunication equipment, the timing messages being determined according to arrival moments of timing pulses carried by the timing information received from the one or more satellites, and the first clock pulses being counted at time intervals between successive arrivals of the timing pulses to form values for the timing messages at the time intervals between the successive arrivals of the timing pulses; and control a data interface of the satellite receiver module to transfer the timing messages to the body device of the telecommunication equipment.

* * * * *